(12) United States Patent
Oberheu

(10) Patent No.: US 9,873,413 B2
(45) Date of Patent: Jan. 23, 2018

(54) PARKING BRAKE REMOTE ACTUATION

(71) Applicant: David J. Oberheu, Stone Mountain, GA (US)

(72) Inventor: David J. Oberheu, Stone Mountain, GA (US)

(*) Notice: Subject to any disclaimer, the term of this patent is extended or adjusted under 35 U.S.C. 154(b) by 175 days.

(21) Appl. No.: 14/971,758

(22) Filed: Dec. 16, 2015

(65) Prior Publication Data

US 2017/0174191 A1 Jun. 22, 2017

(51) Int. Cl.
G05D 1/00 (2006.01)
B60T 7/16 (2006.01)

(52) U.S. Cl.
CPC ...................................... B60T 7/16 (2013.01)

(58) Field of Classification Search
CPC ........................................................ B60T 7/16
USPC ................................................. 701/2; 477/92
See application file for complete search history.

(56) References Cited

U.S. PATENT DOCUMENTS

| 4,572,319 | A | 2/1986 | Fontaine |
| 5,533,795 | A | 7/1996 | Brooks |
| 5,624,352 | A | 4/1997 | Smale |
| 5,706,909 | A | 1/1998 | Bevins et al. |
| 6,322,161 | B1 | 11/2001 | Maslonka |
| 7,300,118 | B2 | 11/2007 | Hoover et al. |
| 8,602,506 | B2 | 12/2013 | Sittnick |
| 8,849,522 | B1 | 9/2014 | Mendenhall et al. |
| 2003/0021922 | A1 | 1/2003 | Bode |
| 2004/0011610 | A1 | 1/2004 | Witzler et al. |
| 2009/0314590 | A1 | 12/2009 | Dagh et al. |
| 2009/0318263 | A1* | 12/2009 | Yuet .......................... B60T 7/16 477/92 |
| 2014/0081544 | A1* | 3/2014 | Fry .......................... B60T 8/323 701/70 |

FOREIGN PATENT DOCUMENTS

JP          1095319 A     4/1998

* cited by examiner

*Primary Examiner* — Thomas G Black
*Assistant Examiner* — Luat T Huynh
(74) *Attorney, Agent, or Firm* — Crose Law LLC; Bradley D. Crose

(57) ABSTRACT

A system for the remote actuation of a parking brake in a vehicle, thereby to insure that the parking brake of the vehicle is set when the driver exits the vehicle, includes: an actuator disposed within a vehicle equipped with air brakes and a parking brake button and coupled to the parking brake button and configured to set the parking brake upon the occurrence of a predetermined event; and a remote actuation device configured to be with the driver of the vehicle and to indicate to the actuator when the driver exits the vehicle such that the actuator sets the parking brake if not already set.

18 Claims, 4 Drawing Sheets

PARKING BRAKE REMOTE ACTUATION

FIELD OF THE INVENTION

The technology described herein relates generally to devices, systems, and methods for remote actuation of a parking brake in a vehicle equipped with airbrakes. More specifically, this technology relates to a device, system, and method for parking brake remote actuation, thereby to insure that the parking brake of a vehicle equipped with airbrakes is set when the driver exits the cab.

BACKGROUND OF THE INVENTION

In vehicles equipped with air brakes, a driver must use caution in exiting the vehicle to insure that the parking brake of the vehicle is set when the driver exits the cab. Such safety precautions are required in order to prevent rollaway accidents.

Related utility patents known in the art include the following:

U.S. Pat. No. 8,602,506, issued to Sittnick on Dec. 10, 2013, discloses an air brake locking device and system.

U.S. Pat. No. 8,849,522, issued to Mendenhall et al. on Sep. 30, 2014, discloses a signal based safety system for a construction zone.

U.S. Pat. No. 5,706,909, issued to Bevins et al. on Jan. 13, 1998, discloses a vehicle safety automatic parking apparatus.

U.S. Pat. No. 5,624,352, issued to Smale on Apr. 29, 1997, discloses an ignition-controlled parking brake interlock.

U.S. Pat. No. 4,572,319, issued to Fontaine on Feb. 25, 1986, discloses an automatic vehicle braking system.

U.S. Pat. No. 6,322,161, issued to Maslonka et al. on Nov. 27, 2001, discloses an apparatus and methods for automatic engagement and locking of a vehicle air parking brake.

U.S. Pat. No. 7,300,118, issued to Hoover et al. on Nov. 27, 2007, discloses an electronic park brake valve system for air brake vehicles.

U.S. Pat. No. 5,533,795, issued to Brooks on Jul. 9, 1996, discloses a brake safety system for vehicles with seat and door control.

Related utility patent application publications known in the art include the following:

U.S. Patent Application No. 2004/0011610, filed by Witzler et al. and published on Jan. 22, 2004, discloses an air brake locking device and system.

U.S. Patent Application No. 2003/0221922, filed by Callow and published on Dec. 4, 2003, discloses an automatic brake actuation system and method for vehicles.

U.S. Patent Application No. 2009/0314590, filed by Dagh et al. and published on Dec. 24, 2009, discloses a system for automatically actuating the parking brake on a vehicle.

Related foreign patents known in the art include the following:

JP Patent No. JPH1095319, issued to Fujitsu Ten Ltd. on Apr. 14, 1998, discloses a vehicular brake.

The foregoing patent and other information reflect the state of the art of which the inventor is aware and are tendered with a view toward discharging the inventor's acknowledged duty of candor in disclosing information that may be pertinent to the patentability of the technology described herein. It is respectfully stipulated, however, that the foregoing patent and other information do not teach or render obvious, singly or when considered in combination, the inventor's claimed invention.

BRIEF SUMMARY OF THE INVENTION

In various exemplary embodiments, the technology described herein provides a device, system, and method for parking brake remote actuation, thereby to insure that the parking brake of a vehicle equipped with airbrakes is set when the driver exits the cab.

In one exemplary embodiment, the technology described herein provides a system for the remote actuation of a parking brake in a vehicle, thereby to insure that the parking brake of the vehicle is set when the driver exits the vehicle. The system includes: an actuator disposed within a vehicle equipped with air brakes and a parking brake button and coupled to the parking brake button and configured to set the parking brake upon the occurrence of a predetermined event; and a remote actuation device configured to be with the driver of the vehicle and to indicate to the actuator when the driver exits the vehicle such that the actuator sets the parking brake if not already set.

In at least one embodiment, the system also includes a lever coupled to the actuator and configured to raise a pull handle of the parking brake button and thereby set the parking brake once the actuator is activated and moves the lever.

In at least one embodiment, the system further includes a POWER light on the actuator to indicate to the driver that the power to the actuator is on and the actuator is activated and ready for use.

In at least one embodiment, the system also includes a READY light on the actuator to indicate to the driver that the actuator is ready and activated.

In at least one embodiment, the system further includes a DEPLOY light on the actuator to indicate to the driver that the actuator is used.

In at least one embodiment, the system also includes a SYSTEM OVERRIDE switch disposed on the actuator and configured for operable engagement by the driver in a circumstance when the system for the remote actuation of a parking brake is deactivated temporarily.

In at least one embodiment of the system, the actuator is further configured to prevent disengagement of the parking brake unless the remote actuation device is present.

In at least one embodiment of the system, the remote actuation device is an electronic card configured for electronic communication with the actuator.

In at least one embodiment of the system, the remote actuation device is an RFID card configured for detection by the actuator.

In at least one embodiment, the system further includes a controller disposed within the actuator and configured for communication with the remote actuation device.

In at least one embodiment, the system also includes a sensor disposed within the actuator and configured to detect the remote actuation device.

In one exemplary embodiment, the technology described herein provides a method to set the parking brake of a vehicle by remote actuation, thereby to insure that the parking brake of the vehicle is set when the driver exits the vehicle. The method includes: equipping a vehicle with an actuator disposed within a vehicle equipped with air brakes and a parking brake button and coupled to the parking brake button and configured to set the parking brake upon the occurrence of a predetermined event; utilizing a remote actuation device configured to be with the driver of the vehicle and to indicate to the actuator when the driver exits the vehicle such that the actuator sets the parking brake if not already set; pairing the actuator device to the remote actuation device for communication between the devices; and identifying, by the remote actuation device with the driver, a departure by the driver.

In at least one embodiment, the method also includes communicating a status to the actuator in the vehicle from the remote actuation device with the driver.

In at least one embodiment, the method further includes engaging the parking brake by the actuator.

In at least one embodiment, the method also includes overriding the actuation by a SYSTEM OVERRIDE switch.

In at least one embodiment, the method further includes utilizing an electronic card for the remote actuation device for electronic communication with the actuator.

In at least one embodiment, the method also includes utilizing an RFID card for the remote actuation device for detection by the actuator.

In at least one embodiment, the method further includes sending a signal from the remote actuation device to the actuator.

In at least one embodiment, the method also includes sending a signal from the actuator to the remote actuation device.

In at least one embodiment, the method further includes preventing disengagement of the parking brake unless the remote activation device is present.

Thus, advantageously, the system and methods disclosed provide a means by which safety is increased for drivers of vehicles equipped with air brakes. This aids in the prevention of the accidental runaway of trucks should the driver neglect to set the parking brake of the vehicle before exiting the vehicle.

There has thus been outlined, rather broadly, the more important features of the technology in order that the detailed description thereof that follows may be better understood, and in order that the present contribution to the art may be better appreciated. There are additional features of the technology that will be described hereinafter and which will form the subject matter of the claims appended hereto. In this respect, before explaining at least one embodiment of the technology in detail, it is to be understood that the invention is not limited in its application to the details of construction and to the arrangements of the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

BRIEF DESCRIPTION OF THE DRAWINGS

The technology described herein is illustrated with reference to the various drawings, in which like reference numbers denote like device components and/or method steps, respectively, and in which.

DETAILED DESCRIPTION OF THE INVENTION

Before describing the disclosed embodiments of this technology in detail, it is to be understood that the technology is not limited in its application to the details of the particular arrangement shown here since the technology described is capable of other embodiments. Also, the terminology used herein is for the purpose of description and not of limitation.

In various exemplary embodiments, the technology described herein provides devices, a system, and methods for parking brake remote actuation, thereby to insure that the parking brake of a vehicle equipped with airbrakes is set when the driver exits the cab and to provide increased safety in the prevention of rollaway vehicle accidents.

Figure 1:
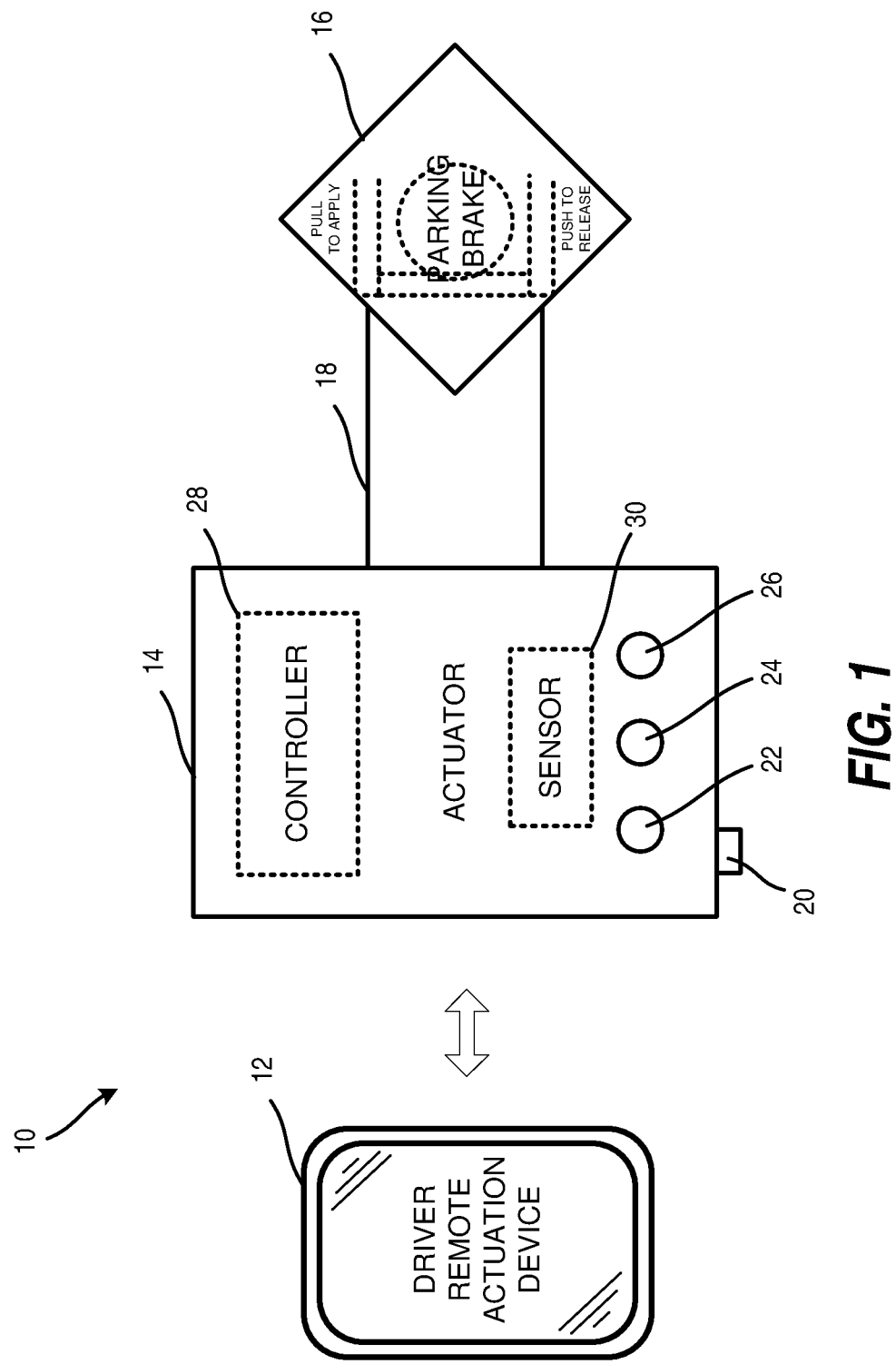
FIG. 1 is a schematic diagram depicting a system for remote actuation of a parking brake in a vehicle equipped with airbrakes, thereby to insure that the parking brake of a vehicle equipped with airbrakes is set when the driver exits the cab, according to an embodiment of the technology described herein.
Figure 2:
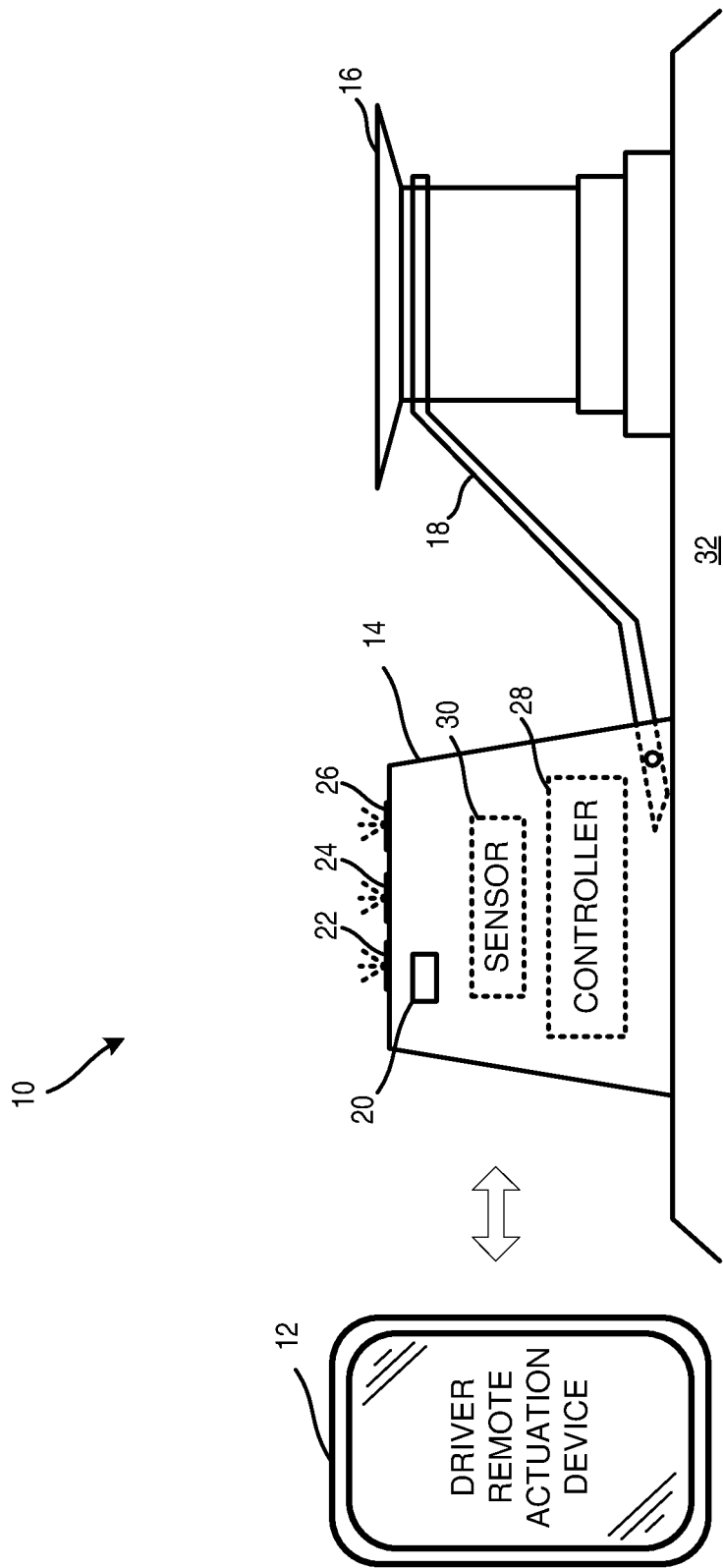
FIG. 2 is a schematic diagram depicting an alternate view of the system for remote actuation of a parking brake in a vehicle equipped with airbrakes depicted in FIG. 1, thereby to insure that the parking brake of a vehicle equipped with airbrakes is set when the driver exits the cab, according to an embodiment of the technology described herein.

Referring now to FIGS. 1 and 2, in one exemplary embodiment, the technology described herein provides a system 10 for the remote actuation of a parking brake in a vehicle, thereby to insure that the parking brake of the vehicle is set when the driver exits the vehicle to air in the prevention of a rollaway vehicle accident.

The system 10 includes an actuator 14 disposed within a vehicle equipped with air brakes and a parking brake button 16. In such vehicles, the parking brake button 16 typically is pulled outwardly or lifted by the driver to set the parking brake, and the parking brake button 16 typically is pushed inwardly or depressed by the driver to disengage the parking brake.

The actuator 14 is coupled to the parking brake button 16 such that it is configured to set the parking brake of the vehicle upon the occurrence of a predetermined event. The predetermined event, is for example, when a driver exits the vehicle neglecting to first set the parking brake. In at least one embodiment, the actuator 14 is an electro-mechanical device that can mechanically move the parking brake button 16 and that is equipped with a means for electronic communication with other devices that can indicate to the actuator 12 that it is to set the parking brake.

The system 10 includes a remote actuation device 12. The remote actuation device 12 is configured to be with the driver of the vehicle. The remote actuation device 12 is configured to indicate to the actuator 12 when the driver exits the vehicle such that the actuator 12 sets the parking brake if not already set. In at least one embodiment, the actuator 12 is placed on a dashboard 32 such that it is easily coupled to the parking brake button 16.

In at least one embodiment, the system 10 also includes a lever 18. The lever 18 is coupled to the actuator 14 and configured to raise a pull handle of the parking brake button 16 and thereby set the parking brake once the actuator 14 is activated and moves the lever. In at least one embodiment, the lever is partially disposed within the actuator 14, and hingedly coupled within the actuator 14. Additionally, the lever 18 is placed adjacent to the parking brake button 16 such that on command it can raise and lower parking brake button 16 to thereby set or disengage the parking brake of the vehicle. As will be apparent upon reading of this disclosure, other means to coupled the actuator 14 to the parking brake button 16 are anticipated that do not require a lever, but are still capable of lifting and depressing the parking brake button 16.

In at least one embodiment, the system 10 further includes a POWER light 22 on the actuator 14. The POWER light 22 on the actuator 14 is configured to indicate to the driver that the power to the actuator 14 is on and the actuator is activated and ready for use.

In at least one embodiment, the system 10 also includes a READY light 24 on the actuator 14. The READY light 24 on the actuator 14 is configured to indicate to the driver that the actuator is ready and activated.

In at least one embodiment, the system 10 further includes a DEPLOY light 26 on the actuator 14. The DEPLOY light 26 on the actuator 14 is configured to indicate to the driver that the actuator is used.

In at least one embodiment, the system 10 also includes a SYSTEM OVERRIDE switch 20. The SYSTEM OVERRIDE switch 20 is disposed on the actuator 14. The SYSTEM OVERRIDE switch 20 is configured for operable engagement by the driver in a circumstance when the system for the remote actuation of a parking brake is deactivated temporarily. By way of example, a driver may wish to override the system utilizing the SYSTEM OVERRIDE switch 20 when towing another vehicle.

In at least one embodiment of the system 10, the actuator 14 is further configured to prevent disengagement of the parking brake unless the remote actuation device 12 is present. For example, should a driver enter a vehicle in which the parking brake is set, but while not having the remote actuation device 12 present, and thereby begin to disengage the parking brake, the actuator 14 disallows the disengagement of the parking brake since the safety system is defeated if the driver is without the remote actuation device 12. This adds additional safety to the system 10 and prevents use when a driver forgets the remote actuation device 12.

In at least one embodiment of the system 10, the remote actuation device 12 is an electronic card configured for electronic communication with the actuator 14. In this embodiment, the remote actuation device 12 is configured for electronic communication with the actuator 14. The presence of the remote actuation device 12 is thereby recognizable by the actuator 14.

In at least one embodiment of the system 10, the remote actuation device 12 is an RFID card configured for detection by the actuator 14. In this embodiment, the remote actuation device 12 is configured for electronic communication with the actuator 14. The presence of the remote actuation device 12 is thereby recognizable by the actuator 14. Both active and passive RFID cards can be utilized in the system 10 in various embodiments.

In at least one embodiment, the remote actuation device 12 is a smart phone or like portable electronic device running an application for communication with the actuator 14.

In at least one embodiment, the system 10 further includes a controller 28. The controller 28 is disposed within the actuator 14 and is configured for communication with the remote actuation device 12. In various embodiments, the controller 28 includes a processor, a memory, and a means for storing data. In at least one embodiment, the controller 28 includes an RFID reader. In at least one embodiment, the controller 28 is configured for communication with a key FOB.

In at least one embodiment, the system 10 also includes a sensor 30. The sensor 30 is disposed within the actuator 14 and is configured to detect the remote actuation device 14. In at least one embodiment the sensor 30 is an RFID sensor which can be detected by an RFID reader at the actuator 14. In various other embodiments, the sensor 30 is an electronic sensor configured to detect the presence of the remote actuation device 14.

Figure 3:
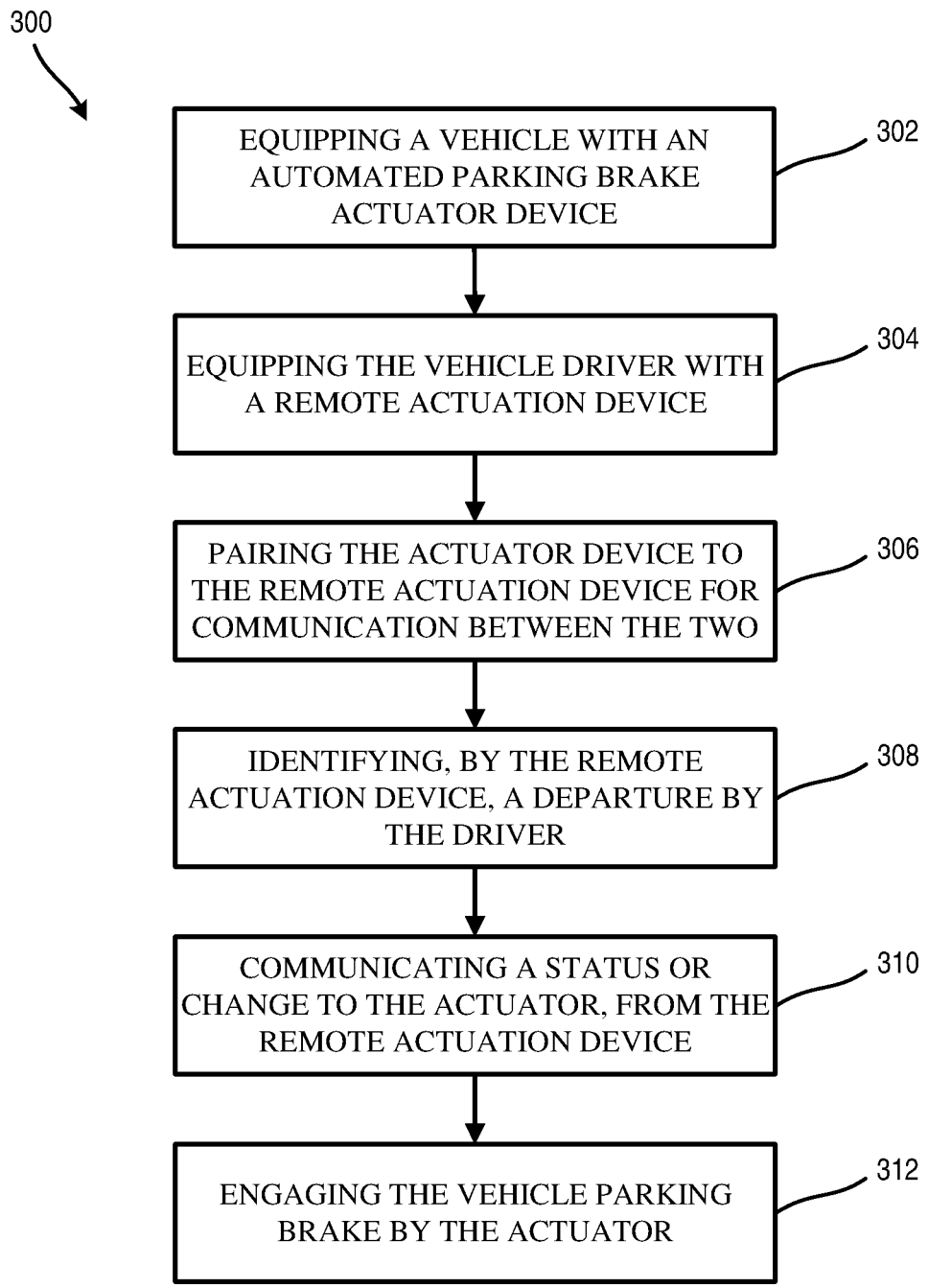
FIG. 3 a flowchart diagram depicting additional method steps for remote actuation of a parking brake in a vehicle equipped with airbrakes, thereby to insure that the parking brake of a vehicle equipped with airbrakes is set when the driver exits the cab, according to an embodiment of the technology described herein.
Figure 4:
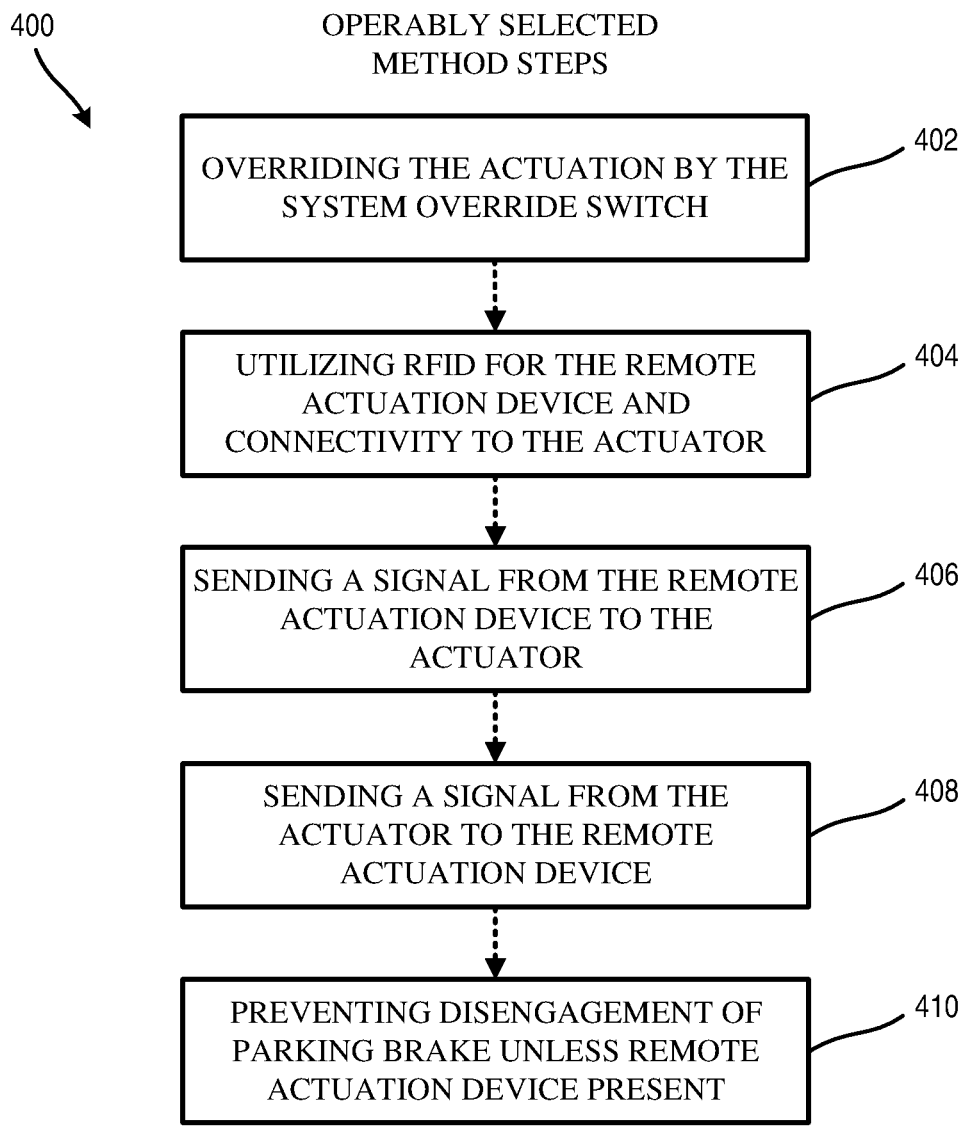
FIG. 4 a flowchart diagram depicting additional method steps for remote actuation of a parking brake in a vehicle equipped with airbrakes, thereby to insure that the parking brake of a vehicle equipped with airbrakes is set when the driver exits the cab, according to an embodiment of the technology described herein.

Referring now to the FIGS. 3 and 4, flowchart diagrams 300 and 400 are shown, depicting a method to set the parking brake of a vehicle by remote actuation, thereby to insure that the parking brake of the vehicle is set when the driver exits the vehicle.

As will be apparent to one of ordinary skill in the art, upon reading this disclosure, some of the method steps depicted in FIGS. 3 and 4 may be implemented in varying order depending on the given circumstances. Additionally, one or more method steps depicted in the Figures may be omitted or substituted under the appropriate circumstances.

At step 302, a vehicle is equipped with an actuator 14. The step 302 includes equipping a vehicle with an actuator disposed within a vehicle equipped with air brakes and a parking brake button and coupled to the parking brake button and configured to set the parking brake upon the occurrence of a predetermined event. By way of example, but not of limitation, a vehicle dashboard 32 is equipped such that the actuator 14 is mounted adjacent to the parking brake button 16 so that it can lift and depress the parking brake button 16 as needed during operation of the system 10.

At step 304, a vehicle driver is equipped with a remote actuation device 12. This step 304 includes utilizing a remote actuation device 12 configured to be with the driver of the vehicle, or on the driver in some form, and to indicate to the actuator when the driver exits the vehicle such that the actuator sets the parking brake if not already set.

At step 306, the remote actuation device is paired to the actuator device. This step 306 includes pairing the actuator 14 device to the remote actuation device 12 for communication between the devices. By way of example, and not of limitation, the pairing may be through a wireless technology protocol, such as Bluetooth®, or through RFID technology, whether active or passive. Other means of electronic, wireless communication between the actuator 14 and the remote actuation device 12 are utilized in various embodiments.

At step 308, the departure of the remote actuation device 12 with the driver is identified by the actuator 14. This step 308 includes identifying a departure by the driver, by the remote actuation device 12 with the driver, and as detected by the actuator 14.

At step 310, a status is communicated to the actuator 14. This step 310 includes communicating a status to the actuator 14 in the vehicle from the remote actuation device 12 with the driver. This step enables the actuator to know that the remote actuation device 12 is no longer in the vehicle and that, if not already set, that the parking brake should be set automatically by the actuator 14.

At step 312, the parking brake is engaged. This step 312 includes engaging the parking brake, via the parking brake button 16, by the actuator 14. The step 312 of setting the parking brake occurs automatically when the remote actuation device 12 has been detected as away from the vehicle by a predetermined existence or other event trigger criteria.

At step 402, the system is overridden by the driver. This step 402 includes overriding the actuation by a SYSTEM OVERRIDE switch 20. In certain circumstances, such as towing another vehicle, for example, a driver may wish to override the system by utilizing the SYSTEM OVERRIDE switch 20.

At step 404, RFID is utilized for the remote actuation device 12. This step 404 includes utilizing an RFID or another type of electronic card for the remote actuation device 12 for electronic communication with the actuator 14. The RFID may be active or passive in various embodiments.

At step 406, a signal is sent from the remote actuation device 12 to the actuator 14. This step 406 includes sending a signal from the remote actuation device 12 to the actuator 14.

At step 408, a signal is sent from the actuator 14 to the remote actuation device 12. This step 408 includes sending a signal from the actuator 14 to the remote actuation device 12.

At step 410, disengagement of the parking brake is prevented. This step 410 includes preventing disengagement of the parking brake unless the remote activation device 12 is present.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the technology disclosed herein and are intended to be covered by the following claims.

What is claimed is:

1. A system for a remote actuation of a parking brake in a vehicle, thereby to insure that the parking brake of the vehicle is set when a driver exits the vehicle, the system comprising:
    an actuator disposed within a vehicle equipped with air brakes and a parking brake button and coupled to the parking brake button and configured to set the parking brake upon an occurrence of a predetermined event and configured to prevent disengagement of the parking brake unless the remote actuation device is present; and
    a remote actuation device configured to be with the driver of the vehicle and to indicate to the actuator when the driver exits the vehicle such that the actuator sets the parking brake if not already set.

2. The system for the remote actuation of a parking brake in a vehicle of claim 1, further comprising:
    a lever coupled to the actuator and configured to raise a pull handle of the parking brake button and thereby set the parking brake once the actuator is activated and moves the lever.

3. The system for the remote actuation of a parking brake in a vehicle of claim 1, further comprising:
    a POWER light on the actuator to indicate to the driver that the power to the actuator is on and the actuator is activated and ready for use.

4. The system for the remote actuation of a parking brake in a vehicle of claim 1, further comprising:
    a READY light on the actuator to indicate to the driver that the actuator is ready and activated.

5. The system for the remote actuation of a parking brake in a vehicle of claim 1, further comprising:
    a DEPLOY light on the actuator to indicate to the driver that the actuator is used.

6. The system for the remote actuation of a parking brake in a vehicle of claim 1, further comprising:
    a SYSTEM OVERRIDE switch disposed on the actuator and configured for operable engagement by the driver in a circumstance when the system for the remote actuation of a parking brake is deactivated temporarily.

7. The system for the remote actuation of a parking brake in a vehicle of claim 1, wherein the remote actuation device is an electronic card configured for electronic communication with the actuator.

8. The system for the remote actuation of a parking brake in a vehicle of claim 1, wherein the remote actuation device is an RFID card configured for detection by the actuator.

9. The system for the remote actuation of a parking brake in a vehicle of claim 1, further comprising:
    a controller disposed within the actuator and configured for communication with the remote actuation device.

10. The system for the remote actuation of a parking brake in a vehicle of claim 1, further comprising:
    a sensor disposed within the actuator and configured to detect the remote actuation device.

11. A method to set a parking brake of a vehicle by remote actuation, thereby to insure that the parking brake of the vehicle is set when a driver exits the vehicle, the method comprising:
    equipping a vehicle with an actuator disposed within a vehicle equipped with air brakes and a parking brake button and coupled to the parking brake button and configured to set a parking brake upon an occurrence of a predetermined event and configured to prevent disengagement of the parking brake unless the remote actuation device is present;
    utilizing a remote actuation device configured to be with the driver of the vehicle and to indicate to the actuator when the driver exits the vehicle such that the actuator sets the parking brake if not already set;
    pairing the actuator device to the remote actuation device for communication between the devices;
    identifying, by the remote actuation device with the driver, a departure by the driver; and
    preventing disengagement of the parking brake unless the remote activation device is present.

12. The method to set the parking brake of a vehicle by remote actuation of claim 11, further comprising:
    communicating a status to the actuator in the vehicle from the remote actuation device with the driver.

13. The method to set the parking brake of a vehicle by remote actuation of claim 11, further comprising:
    engaging the parking brake by the actuator.

14. The method to set the parking brake of a vehicle by remote actuation of claim 11, further comprising:
   overriding the actuation by a SYSTEM OVERRIDE switch.

15. The method to set the parking brake of a vehicle by remote actuation of claim 11, further comprising:
   utilizing an electronic card for the remote actuation device for electronic communication with the actuator.

16. The method to set the parking brake of a vehicle by remote actuation of claim 11, further comprising:
   utilizing an RFID card for the remote actuation device for detection by the actuator.

17. The method to set the parking brake of a vehicle by remote actuation of claim 11, further comprising:
   sending a signal from the remote actuation device to the actuator.

18. The method to set the parking brake of a vehicle by remote actuation of claim 11, further comprising:
   sending a signal from the actuator to the remote actuation device.

\* \* \* \* \*